3,741,777
TREATING PROCESS TO IMPROVE SEPARABILITY OF BACON SLICES

Raymond J. Wrobel, Chicago, and Robert B. Rendek, Hillside, Ill., assignors to Armour and Company, Chicago, Ill.
No Drawing. Filed Oct. 6, 1970, Ser. No. 78,618
Int. Cl. A22c 18/00; A22b 1/02
U.S. Cl. 99—159  10 Claims

ABSTRACT OF THE DISCLOSURE

A pickle solution containing lecithin is pumped into a pork belly and the belly then sliced to form bacon slices which can be more easily separated from each other.

BACKGROUND AND SUMMARY

Through the years a frustrating experience for the housewife has been the separation of bacon slices immediately after withdrawal of the bacon from the refrigerator. The problem is magnified considerably if the bacon has been vacuum-packed.

Various methods have been investigated by which the adherence of the bacon slices could be remedied. Physical methods, such as the tempering of the bacon, and chemical means, such as the spraying of substances on the surface of each bacon slice or strip, and various packaging concepts have been attempted, but these have failed because of only partial effectiveness, impracticability, or economic disadvantages.

We have discovered a practical and efficient method for treatment of pork bellies to improve bacon slice separability or peelability and in which the lecithin is dispersed in the aqueous pickle solution and pumped with the solution into the belly and after processing, chilling and forming, the belly then sliced. The lecithin is thus distributed throughout the belly and the knife or slicing blade in the slicing operation further spreads the lecithin on the slices. We find that a further improvement is achieved by adding a phosphate to the lecithin-pickle solution as a means for retaining moisture in the slices.

DETAILED DESCRIPTION

In the practice of our invention, we pump a pickle solution containing lecithin into the pork belly and then after the usual processing and chilling, we slice the belly to form bacon slices while at the same time spreading the lecithin over the slice surfaces. Why the lecithin should prevent the bacon strips from cohering and allowing for an easier release of the slices cannot be stated positively, but it may be that when the lecithin is dispersed in water, it forms a hydrate (takes on water molecules) and in its hydrated form, the lecithin becomes insoluble in fat and soluble in water. The moisture in packaged bacon is brought to the surface of the bacon slices and it may be that the lecithin in moisture forms a surface film between each slice, allowing for a smooth release action between the adhering slices. Whatever the explanation, we have discovered that the addition of lecithin to the pickle solution pumped into the pork belly which is processed and chilled followed by a slicing of the belly results in increased peelability of the slices.

After pumping, any suitable treating may be employed to make the belly suitable for slicing, and we prefer to process, as by smoke and heat treatment, the belly and chill the belly before slicing. If desired, the belly may be molded or formed after the chilling step.

The lecithin may be any suitable lecithin which can be dispersed in water or an aqueous solution, such as pickle solution. The lecithin may be a vegetable lecithin, such as lecithin derived from soybeans or cottonseed, etc., or it may come from an animal source. We prefer to employ a vegetable lecithin.

The pickle solution may be taken from any general pickle formulate. A typical pickle solution includes sodium nitrite, tripolyphosphate, sodium erythorbate, sodium chloride, brown sugar, and water. Such a pickle composition, based on 100 gallons of pickle and including lecithin, may be formulated as follows:

Sodium nitrite—0.5 to 2.0 lbs. or .05% to 0.2%
Tripolyphosphate—15 to 50 lbs. or 1.5% to 5.0%
Sodium erythorbate—16 to 87.5 oz. or 0.1% to 0.5%
Sodium chloride—60 to 180 lbs. or 6.0% to 18%
Brown sugar—5 to 50 lbs. or 0.5% to 5%
Lecithin—0.97 to 14.6 lbs. or 0.1% to 1.5%
Water—92% to 70%

The pumping range depending on what pickle solution is used may vary from 8 to 20 percent and as the range approaches 20 percent lesser amounts of each ingredient are employed.

We prefer to employ a sufficient amount of lecithin in the pickle solution to provide in the belly a content of about 0.024 to 1.0 percent by weight. Preferably the range is about 0.024 to 0.5 percent.

By way of example, bellies injecto-pumped 12 to 13 percent by weight with a pickle containing lecithin at a level of 0.8 percent results in approximately 0.1 percent lecithin being retained in the finished product.

In the pickle solution, we prefer to employ about 0.1 to 1.5 percent of lecithin by weight, and our preferred range is about 0.2 to 0.8 percent. One reason for not exceeding the 1.5 percent range is the objectionable odor and color that develop during the frying of the bacon. However, if the lecithin is further refined or purified, it is possible to increase the content of lecithin in the pickle solution up to about 2.4 percent.

While some available lecithin products are readily dispersible in water, it may be necessary for some commercial lecithin material, such as soybean lecithin, to mix the same with boiling water to form a hydrate and then dispersing the hydrated lecithin in a warm solution (about 125–150° F.) of water for adding to the pickle solution. Any suitable treatment may be employed to make the lecithin readily dispersible in an aqueous solution, and preferably in an aqueous pickle solution.

We have discovered that the peelability can be further improved by incorporating a phosphate material in the lecithin-pickle solution. As phosphates, we may use any noncyclic, polyphosphated salt of sodium or potassium, having a ratio of $H_2O$ to $P_2O_5$ of about 0.9 to 1 to about 2.0 to 1. The preferred polyphosphate is sodium tripolyphosphate. Other preferred phosphates are sodium hexametaphosphate, tetrasodium pyrophosphate, tetrapotassium pyrophosphate, and potassium tripolyphosphate. The addition of a non-cyclic polyphosphate salt of an alkali metal selected from the group consisting of sodium and potassium is effective in retaining moisture in the slices and yields a still further improved peelability of the slices. We prefer to employ sodium tripolyphosphate which may be added to the lecithin-pickle solution in the amount of about 2.0 to 2.5 percent by weight. If desired, a combination of sodium tripolyphosphate and hexametaphosphate may be employed.

In the operation of the process, the pumping of the pork belly is accomplished in the usual manner with hollow needles extending into the belly and a pump being utilized for forcing the pickle into the belly, and then after pumping, processing and chilling, the slicing knife is found to be effective in spreading lecithin across the surface of the slices so that the stacked sliced product becomes more easily peelable.

Specific examples illustrative of the process may be set out as follows:

EXAMPLE I

This experiment involved the curing of 22 "paired bellies" *with* and *without* the use of lecithin in the pickle solution. Paired bellies were used as to eliminate any deviations that may exist regarding differences in the physical and chemical properties of two separate and unlike hogs.

The following curing formula, based on 100 gallons of pickle, was used in curing one belly from each set of paired bellies:

Formula

| Ingredient: | Percent of total weight (100 gals.) |
|---|---|
| Brown sugar | 3.14 |
| Sodium erythorbate | 0.19 |
| Sodium nitrite | 0.15 |
| Commercial soy-lecithin | 0.20 |
| Sodium chloride | 14.00 |
| Water | 82.32 |

The other corresponding paired belly was pumped with the same pickle solution but *minus* the lecithin. Each belly, *with* and *without* the lecithin, was pumped 12 percent of its original fresh weight using an Anco pickle injection machine.

To properly dispense the lecithin in the cold (40–60° F.) pickle solution, the lecithin was treated in the following manner:

The needed amount of lecithin required to formulate a specific batch size of pickle is placed in a volume of water equal to 5 times the weight of the lecithin. The water and lecithin combination is mixed (mechanical agitation) and brought to boil (200–212° F.). The excess water is then decanted and the hydrated lecithin is re-dispersed in a volume of warm water (125–150° F.), 10 times the weight of the lecithin (e.g., 1 lb. of lecithin to 10 lbs. of water). The dispersion is maintained by constant agitation over a period of 20 to 30 times, after which it is added to the base pickle solution just prior to pumping of the bellies.

After pumping each set of bellies with the respective pickle solution (*with* lecithin, "Lecithinated Pickle," and *without* lecithin, "Control Pickle"), the bellies were held on drain for 2 hours before being placed in the smokehouse for processing. Smokehouse processing entails starting the house at 140–150° F. and holding at this temperature (approximately 4 to 5 hours) until an internal temperature of 128–132° F. is reached in the bellies. The house temperature is then lowered to 130° F. and this temperature maintained (approximately 3 to 4 additional hours) until the bellies are "finished" off. Smoke application was made over a 4 to 5 hour period, during the processing cycle.

The bellies were then chilled (30–35° F.), molded, and placed in tempering cabinets (24–30° F.) before slicing, using an Anco bacon slicer machine for this purpose.

Bellies were sliced flank *first*—shoulder *last*, so that drafts #2 and #3 (approximately 1 lb. drafts) represent the flank portion of the belly, #5 and #6 the center, and #9 and #10 the shoulder section. The even number drafts, specifically #2, #6 and #10, were vacuum-sealed in plastic pouches, while the odd number drafts #3, #5 and #9 were placed on tray boards and packages in Slide-A-Pac cartons.

Peelability studies (using the Instron Tensile Tester) were made between parallel drafts (one *with* "lecithinated pickle," the other *without*) from the same cross section of the paired bellies.

The packaged bacon was also exposed to a simulated shipping cycle, which involves temperature changes that may occur during the shipment of bacon from one destination to another, prior to undertaking any peelability studies. On completion of the shipping cycle, the bacon was held under refrigeration (36–40° F.) for at least 24 hours before any peel tests were determined.

Results of this test are as follows:

| Packaging system | Section of belly | Peel advantage for lecithinated bacon, percent |
|---|---|---|
| Vacuum | Flank | 13.5 |
| Do | Center | 14.2 |
| Do | Shoulder | 16.5 |
| S.A.P | Flank | 18.7 |
| S.A.P | Center | 6.6 |
| S.A.P | Shoulder | 12.3 |

EXAMPLE II

This test is a duplication of Example I with the following exceptions:

(a) 12 *paired* bellies were tested
(b) The level of lecithin was raised to 0.8% in the pickle [1]

Results of this test are as follows:

| Packaging system | Section of belly | Peel advantage for lecithinated bacon, percent |
|---|---|---|
| Vacuum | Flank | 29.6 |
| Do | Center | 30.2 |
| Do | Shoulder | 21.9 |
| S.A.P | Flank | 34.9 |
| S.A.P | Center | 26.7 |
| S.A.P | Shoulder | 40.8 |

EXAMPLE III

This test is a replication of Example I with the following exception:

(a) Alcolec 505 was substituted for the regular commercial soybean lecithin used in Examples I and II. Alcolec 505 is a commercial vegetable lecithin product which on gross analysis resembles other commercial lecithins. It is a natural lecithin *not* modified by chemical treatment. The advantage of Alcolec 505 over other natural lecithins is its ability to disperse more readily in water. This important characteristic of Alcolec 505 allows us to merely disperse the lecithin in warm water (125–150° F.) before adding it to the pickle solution. In this experiment Alcolec 505 was used at a 0.2% level in the pickle, identical to the level of lecithin described in Example I.

Results:

Peelability data indicates that the vacuum-packaged lecithinated bacon (Alcolec 505) has a 21.1% peel-advantage (ave. of entire belly) over the non-lecithinated (control) bacon. The Slide-A-Pac lecithinated bacon has an average peel-improvement of 5.2% over the control bacon.

EXAMPLE IV

This experiment was designed in the same manner as Example III, i.e., using Alcolec 505 in the pickle solution in place of regular commercial lecithin, except that tripolyphosphate was also included in the curing solution.

---

[1] A level of 0.8% lecithin in the pickle and using a 12% pump brings the level of lecithin in the belly to approximately 0.1% on pumping.

The curing formula based on 100 gallons of pickle then has the following percent composition:

Formula

| Ingredient: | Percent of total weight (100 gals.) |
|---|---|
| Brown sugar | 3.0 |
| Sodium erythorbate | 0.19 |
| Sodium nitrite | 0.15 |
| Alcolec 505 | 0.20 |
| Sodium chloride | 13.70 |
| Tripolyphosphate | 2.5 |
| Water | 80.26 |

The same peelability comparisons, but with polyphosphates added to both of the pickle solutions (one with Alcolec 505, the other without), gave the following results:

| Packaging system | Section of belly | Peel advantage for lecithinated bacon, percent |
|---|---|---|
| Vacuum | Flank | 18.0 |
| Do | Center | 14.3 |
| Do | Shoulder | 24.3 |
| S.A.P | Flank | 18.6 |
| S.A.P | Center | 3.7 |
| S.A.P | Shoulder | 9.9 |

EXAMPLE V

This experiment is the same as Example IV with the following exceptions:

(a) Alcolec 505 was used at an 0.8% level in the pickle
(b) A phosphate, which is primarily a combination of tripolyphosphate and hexametaphosphate, was substituted for regular tripolyphosphate in the curing pickle
(c) 12 paired bellies were used for comparative purposes Results are as follows:

| Packaging system | Section of belly | Peel advantage for lecithinated bacon, percent |
|---|---|---|
| Vacuum | Flank | 35.9 |
| Do | Center | 18.4 |
| Do | Shoulder | 30.5 |
| S.A.P | Flank | 36.6 |
| S.A.P | Center | 28.1 |
| S.A.P | Shoulder | 23.4 |

While in the foregoing specification we have set out specific steps in considerable detail as illustrative of the invention, it will be understood that such details may be varied widely by those skilled in the art without departing from the spirit of our invention.

We claim:

1. In a process for improving the separability of raw bacon slices, the steps of preparing an aqueous pickle solution containing from 0.1 to 2.4 percent lecithin and water in an amount of from about 70 to 92 percent, injecting said solution through needles into a pork belly in an amount of from 8 to 20 percent based on the weight of said solution as compared with the weight of said belly, and after processing and chilling, slicing the belly so injected to form bacon slices.

2. A process as set forth in claim 1 in which said solution contains sodium chloride salt in the amount of from 6 to 18 percent.

3. A process as set forth in claim 2 in which said solution contains sodium nitrite in the amount of from about 0.05 to 0.2 percent.

4. A process as set forth in claim 3 wherein said solution contains brown sugar in an amount of 0.5 to 5 percent.

5. A process as set forth in claim 1 in which said solution contains from 1.5 to 5.0 percent of a noncyclic polyphosphate acid salt of an alkali metal selected from the group consisting of sodium and potassium.

6. A process as set forth in claim 1 wherein said lecithin is in hydrated form.

7. A process as set forth in claim 6 wherein said lecithin is heated in water to hydrate the same prior to the formation of said solution.

8. A process as set forth in claim 7 in which said lecithin is heated at about 200° to 212° F., the water decanted, and the hydrated lecithin introduced in said solution in water at a temperature of from 125° to 150° F.

9. A process as set forth in claim 1 including the additional steps of stacking said slices of bacon and subsequently peeling the slices to separate the same one from another.

10. A process as set forth in claim 1 in which said solution contains from about 0.2 to 0.8 percent by weight of lecithin.

References Cited

UNITED STATES PATENTS

| 2,201,064 | 5/1940 | Thurman | 99—15 |
| 2,688,555 | 9/1954 | Komarik et al. | 99—159 |
| 2,772,169 | 11/1956 | Hall | 99—159 |
| 2,876,115 | 3/1959 | Epstein | 99—222 |
| 2,927,029 | 3/1960 | Long | 99—169 X |
| 3,052,560 | 9/1962 | Delaney | 99—222 |
| 3,054,675 | 9/1962 | Hale et al. | 99—15 X |
| 3,141,779 | 7/1964 | Podebrodsky et al. | 99—169 X |
| 3,595,679 | 7/1971 | School et al. | 99—159 |

HYMAN LORD, Primary Examiner

U.S. Cl. X.R.

99—107, 222